(12) United States Patent
Tashiro et al.

(10) Patent No.: US 12,080,536 B2
(45) Date of Patent: Sep. 3, 2024

(54) SAMPLE SUPPORT, ADAPTER, IONIZATION METHOD AND MASS SPECTROMETRY METHOD

(71) Applicant: HAMAMATSU PHOTONICS K.K., Hamamatsu (JP)

(72) Inventors: Akira Tashiro, Hamamatsu (JP); Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 430 days.

(21) Appl. No.: 17/623,767

(22) PCT Filed: Apr. 1, 2020

(86) PCT No.: PCT/JP2020/015095
§ 371 (c)(1),
(2) Date: Dec. 29, 2021

(87) PCT Pub. No.: WO2021/005849
PCT Pub. Date: Jan. 14, 2021

(65) Prior Publication Data
US 2022/0223396 A1    Jul. 14, 2022

(30) Foreign Application Priority Data
Jul. 5, 2019  (JP) ................................ 2019-126155

(51) Int. Cl.
*H01J 49/04*     (2006.01)
*H01J 49/00*     (2006.01)
(52) U.S. Cl.
CPC ...... *H01J 49/0418* (2013.01); *H01J 49/0031* (2013.01)

(58) Field of Classification Search
CPC .......................... H01J 49/0418; H01J 49/0031
See application file for complete search history.

(56) References Cited

U.S. PATENT DOCUMENTS

| 2005/0045815 A1 | 3/2005 | Bui |
| 2007/0023682 A1 | 2/2007 | Benevides |

(Continued)

FOREIGN PATENT DOCUMENTS

| CN | 106796198 A | 5/2017 |
| CN | 107076705 A | 8/2017 |

(Continued)

OTHER PUBLICATIONS

International Preliminary Report on Patentability mailed Jan. 20, 2022 for PCT/JP2020/015095.

*Primary Examiner* — Nicole M Ippolito
*Assistant Examiner* — Hanway Chang
(74) *Attorney, Agent, or Firm* — Faegre Drinker Biddle & Reath LLP (57) ABSTRACT

A sample support is used for ionization of a sample. The sample support includes a film part having a first front surface and a first back surface, the film part being formed with a plurality of through-holes, and a support part defining a measurement region for ionizing the sample with respect to the film part and supporting the film part. The support part includes an inner portion having a second front surface and a second back surface, the film part being fixed to the inner portion, and an outer portion having a third front surface and a third back surface and extending along an outer edge of the inner portion. A difference generated between a position of the first front surface and a position of the third front surface in a thickness direction of the film part is smaller than a thickness of the film part.

11 Claims, 10 Drawing Sheets

(56) References Cited

U.S. PATENT DOCUMENTS

| | | |
|---|---|---|
| 2013/0306856 A1 | 11/2013 | Trimpin et al. |
| 2013/0337502 A1 | 12/2013 | Boßmeyer et al. |
| 2017/0358436 A1 | 12/2017 | Naito et al. |

FOREIGN PATENT DOCUMENTS

| | | |
|---|---|---|
| JP | 2004-510996 A | 4/2004 |
| JP | 6093492 B1 | 3/2017 |
| JP | 2017-187405 A | 10/2017 |
| WO | WO-02/30561 A2 | 4/2002 |
| WO | WO-2015/116627 A1 | 8/2015 |
| WO | WO-2019/106961 A1 | 6/2019 |

SAMPLE SUPPORT, ADAPTER, IONIZATION METHOD AND MASS SPECTROMETRY METHOD

TECHNICAL FIELD

The present disclosure relates to a sample support, an adapter, an ionization method, and a mass spectrometry method.

BACKGROUND ART

Conventionally, a laser desorption/ionization method is known as a method of ionizing a sample such as a biological sample to perform mass spectrometry or the like. As a sample support used in a laser desorption/ionization method, Patent Literature 1 describes one including a substrate in which a plurality of through-holes are formed and a conductive layer provided on at least one surface of the substrate.

CITATION LIST

Patent Literature

[Patent Literature 1] Japanese Patent No. 6093492

SUMMARY OF INVENTION

Technical Problem

When a sample support as described above is mounted on a mass spectrometer, an adapter having a reference surface positioned on the same plane as a focal point of an energy beam such as a laser beam may be used in the mass spectrometer. In such a case, when a focal point of an energy beam is aligned with a conductive layer provided on one surface of the substrate with high accuracy, sensitivity and resolution are improved in detection of components of the ionized sample.

Therefore, an objective of the present disclosure is to provide a sample support, an adapter, an ionization method, and a mass spectrometry method that enable highly accurate positioning of a focal point of an energy beam in a mass spectrometer.

Solution to Problem

A sample support of one aspect of the present disclosure is a sample support used for ionization of a sample and includes a film part having a first front surface and a first back surface, the film part being formed with a plurality of through-holes opening to the first front surface and the first back surface, and a support part defining a measurement region for ionizing the sample with respect to the film part and supporting the film part, in which the support part includes an inner portion having a second front surface and a second back surface, the film part being fixed to the inner portion, and an outer portion having a third front surface and a third back surface and extending along an outer edge of the inner portion, and a difference generated between a position of the first front surface and a position of the third front surface in a thickness direction of the film part is smaller than a thickness of the film part.

In the sample support, a difference generated between a position of the first front surface of the film part and a position of the third front surface of the outer portion in the thickness direction of the film part is smaller than the thickness of the film part. Thereby, when the sample support is mounted on a mass spectrometer using an adapter having a reference surface positioned on the same plane as a focal point of an energy beam such as a laser beam in the mass spectrometer, the focal point of the energy beam can be aligned with the first front surface of the film part at a lower level than the thickness of the film part by causing the adapter to hold the outer portion so that the reference surface of the adapter and the third front surface of the outer portion are positioned on the same plane. Therefore, the sample support enables highly accurate positioning of a focal point of the energy beam in the mass spectrometer.

In the sample support of one aspect of the present disclosure, the first front surface and the third front surface may be positioned on the same plane. Thereby, a focal point of the energy beam can be more accurately aligned with the first front surface of the film part in the mass spectrometer.

In the sample support of one aspect of the present disclosure, the second back surface may be positioned on a side on which the first front surface faces in the thickness direction with respect to the third back surface, and the film part may be fixed to the second back surface. Thereby, a configuration in which a focal point of the energy beam can be aligned with the first front surface of the film part with high accuracy can be realized with a simple structure.

In the sample support of one aspect of the present disclosure, the second front surface may be positioned on a side on which the first back surface faces in the thickness direction with respect to the third front surface, and the film part may be fixed to the second front surface. Thereby, a configuration in which a focal point of the energy beam can be aligned with the first front surface of the film part with high accuracy can be realized with a simple structure.

In the sample support of one aspect of the present disclosure, the film part may include a substrate formed of an insulating material, and a conductive layer provided at least on the first front surface side with respect to the substrate at least in the measurement region. Thereby, components of the sample can be efficiently ionized in the mass spectrometer.

In the sample support of one aspect of the present disclosure, a width of each of the plurality of through-holes may be 1 to 700 nm. Thereby, components of the sample can be appropriately retained on the first front surface of the film part.

In the sample support of one aspect of the present disclosure, the support part may define a plurality of measurement regions, each of the plurality of measurement regions being the measurement region. Thereby, the sample can be analyzed for each measurement region in the mass spectrometer.

An adapter of one aspect of the present disclosure is an adapter used for mounting the above-described sample support on a mass spectrometer and includes a holding part having a reference surface positioned on the same plane as a focal point of an energy beam in the mass spectrometer and configured to hold the outer portion so that the reference surface and the third front surface are positioned on the same plane.

According to the adapter, a focal point of the energy beam can be aligned with the first front surface of the film part with high accuracy in the mass spectrometer.

The adapter of one aspect of the present disclosure may further include a mount part configured to be held by the holding part together with the outer portion in a state in which the mount part is in contact with the first back surface. Thereby, since the film part can be stably supported, a focal point of the energy beam can be more accurately aligned with the first front surface of the film part in the mass spectrometer.

An ionization method of one aspect of the present disclosure includes a step of preparing the above-described sample support, a step of disposing the sample in the measurement region, a step of mounting the sample support on a mass spectrometer using an adapter including a holding part having a reference surface positioned on the same plane as a focal point of an energy beam in the mass spectrometer and configured to hold the outer portion so that the reference surface and the third front surface are positioned on the same plane, and a step of ionizing components of the sample by irradiating the measurement region with an energy beam.

According to the ionization method, components of the sample can be ionized with a focal point of the energy beam aligned with the first front surface of the film part with high accuracy.

A mass spectrometry method of one aspect of the present disclosure includes a plurality of steps included in the above-described ionization method, and a step of detecting the ionized components.

In the mass spectrometry method, since components of the sample are ionized with the focal point of the energy beam aligned with the first front surface of the film part with high accuracy, sensitivity and resolution can be improved in detection of the ionized components.

Advantageous Effects of Invention

According to the present disclosure, it is possible to provide a sample support, an adapter, an ionization method, and a mass spectrometry method that enable highly accurate positioning of a focal point of an energy beam in a mass spectrometer.

DESCRIPTION OF EMBODIMENTS

Hereinafter, embodiments of the present disclosure will be described in detail with reference to the drawings. In each of the drawings, the same or corresponding portions are denoted by the same reference signs, and duplicate descriptions thereof will be omitted.

First Embodiment

[Configuration of Sample Support]

Figure 1:
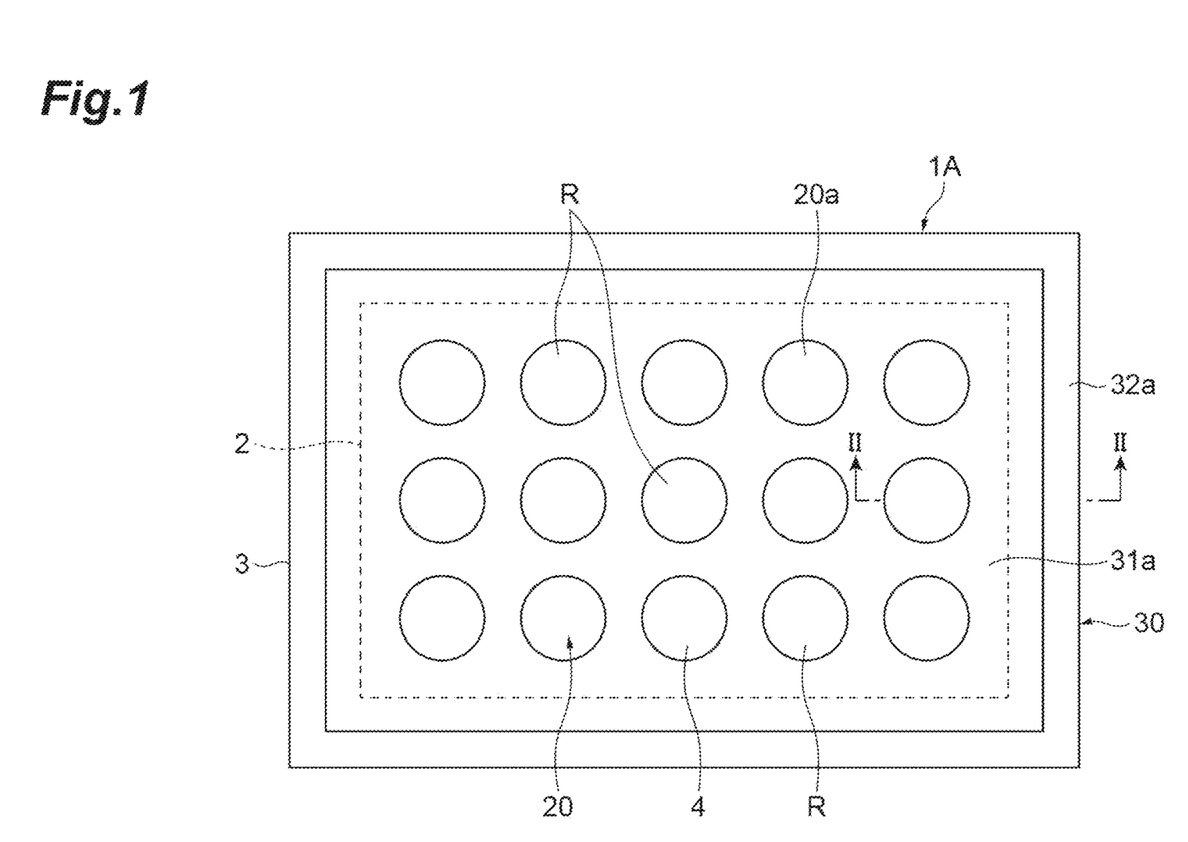
FIG. 1 is a plan view of a sample support of a first embodiment.
Figure 2:
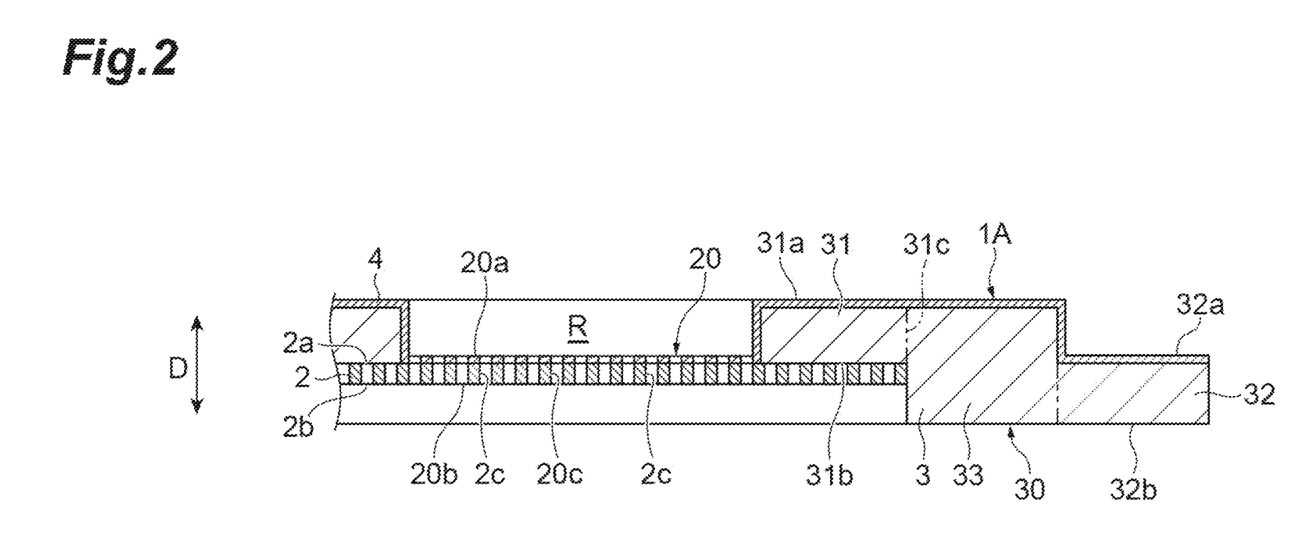
FIG. 2 is a cross-sectional view along line II-II illustrated in FIG. 1.

A sample support 1A illustrated in FIGS. 1 and 2 is used for ionization of a sample. The sample support 1A includes a substrate 2, a frame 3, and a conductive layer 4. The substrate 2 includes a surface 2a and a back surface 2b (a surface on a side opposite to the surface 2a). A plurality of through-holes 2c that open to the surface 2a and the back surface 2b are formed in the substrate 2. Each of the through-holes 2c extends in a thickness direction D of the substrate 2 (hereinafter, simply referred to as "direction D"). The direction D is a direction in which the surface 2a and the back surface 2b face each other.

The substrate 2 is formed of, for example, an insulating material in a rectangular plate shape. A length of one side of the substrate 2 when viewed in the direction D is, for example, about several centimeters, and a thickness of the substrate 2 is, for example, 1 to 50 µm. A shape of each through-hole 2c when viewed in the direction D is, for example, substantially circular, and a width of each through-hole 2c is, for example, 1 to 700 nm. The plurality of through-holes 2c each having a substantially constant width are uniformly formed (with a uniform distribution) in the substrate 2. An aperture ratio of the through-holes 2c in a measurement region R (a proportion occupied by all the through-holes 2c to the measurement region R when viewed in the direction D) is in a range of 10% to 80% in view of practical use, and particularly preferably in a range of 60 to 80%. Further, in the plurality of through-holes 2c, widths of the through-holes 2c may not all be uniform, or the through-holes 2c may be partially connected to each other.

Figure 3:
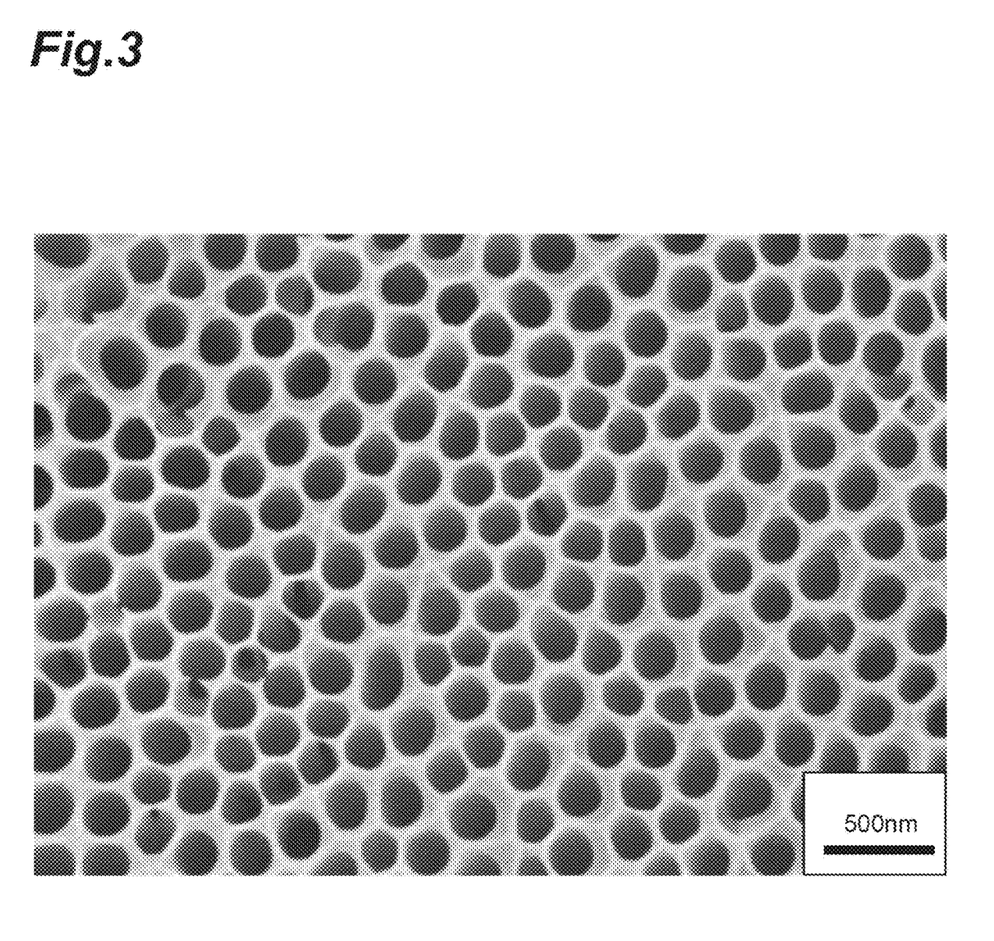
FIG. 3 is a view showing an SEM image of a surface of a substrate illustrated in FIG. 1.

The width of the through-hole 2c is a value obtained as follows. First, images of the surface 2a and the back surface 2b of the substrate 2 are acquired. FIG. 3 is a view showing an SEM image of the surface 2a of the substrate 2. In the SEM image, black portions are the through-holes 2c, and white portions are partition wall portions between the through-holes 2c. Next, a plurality of pixel groups corresponding to a plurality of first openings (openings on the surface 2a side of the through-holes 2c) in the measurement region R (to be described later) are extracted by performing, for example, binarization processing on the acquired image of the surface 2a, and a diameter of a circle having an average area of the first openings is obtained on the basis of a size per pixel. Similarly, a plurality of pixel groups corresponding to a plurality of second openings (openings on the back surface 2b side of the through-holes 2c) in the measurement region R are extracted by performing, for example, binarization processing on the acquired image of the back surface 2b, and a diameter of a circle having an average area of the second openings is obtained on the basis of a size per pixel. Then, an average value of the diameter of the circle acquired for the surface 2a and the diameter of the circle acquired for the back surface 2b is acquired as a width of the through-hole 2c.

The substrate 2 illustrated in FIG. 3 is an alumina porous film formed by anodizing aluminum (Al). Specifically, the substrate 2 can be obtained by subjecting the Al substrate to an anodizing treatment and peeling an oxidized surface portion from the Al substrate. Further, the substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like, or may be formed by anodizing silicon (Si).

As illustrated in FIGS. 1 and 2, the frame 3 is fixed to the surface 2a of the substrate 2 by an adhesive layer (not illustrated). As a material of the adhesive layer, an adhesive material (for example, a low melting point glass, an adhesive for vacuum, or the like) having little discharge gas is preferably used. The frame 3 is formed in a rectangular plate shape using, for example, a material having the same coefficient of thermal expansion as a material of the substrate 2 or a material having a coefficient of thermal expansion lower than that of the material of the substrate 2 (for example, an iron-nickel alloy (42 alloy), molybdenum, Kovar, titanium, or the like when the material of the substrate 2 is alumina). A length of one side of the frame 3 when viewed in the direction D is, for example, about several centimeters, and a thickness of the frame 3 is, for example, 1 mm or less. When viewed from the direction D, an outer edge of the frame 3 is positioned on an outer side of an outer edge of the substrate 2. A plurality of openings disposed two-dimensionally (for example, in a matrix form such as 3 rows and 5 columns) are formed in the frame 3. A portion of the substrate 2 corresponding to each of the openings of the frame 3 functions as the measurement region R for ionizing a sample. A shape of each opening when viewed in the direction D is, for example, a circle, and a diameter of each opening in that case is, for example, about several millimeters to tens of millimeters. Further, when a material having the same coefficient of thermal expansion as the material of the substrate 2 or a material having a coefficient of thermal expansion lower than that of the material of the substrate 2 is used for the frame 3, the substrate 2 can be prevented from bending after bonding and calcining, and sufficient adhesion between the substrate 2 and a sample S and improvement in sensitivity can be realized in mass spectrometry. When the substrate 2 and the frame 3 on which the conductive layer 4 is formed are calcined during manufacture of the sample support 1A, crystallinity of the conductive layer 4 can be improved, and a sample support more suitable for mass spectrometry can be obtained.

The conductive layer 4 is continuously (integrally) formed in a region of the surface 2a of the substrate 2 corresponding to each opening of the frame 3 (that is, a region of the surface 2a of the substrate 2 corresponding to each measurement region R), an inner surface of each opening, and a surface of the frame 3 on a side on which the surface 2a faces in the direction D. The conductive layer 4 covers a region of the surface 2a of the substrate 2 in which the plurality of through-holes 2c are not formed in each measurement region R. The conductive layer 4 is formed of a conductive material. However, as a material of the conductive layer 4, for the reason to be described below, a metal having a low affinity (reactivity) with a sample and high conductivity is preferably used.

When the conductive layer 4 is formed of, for example, a metal such as copper (Cu) that has a high affinity with a sample such as a protein, the sample is ionized in a state in which Cu atoms are attached to sample molecules in the process of ionizing the sample, and there is a likelihood that a detection result thereof will deviate in the mass spectrometry method according to an amount of the attached Cu atoms. Therefore, as the material of the conductive layer 4, a metal having a low affinity with a sample is preferably used.

On the other hand, a metal having higher conductivity tends to apply a constant voltage easily and stably. Therefore, when the conductive layer 4 is formed of a metal having high conductivity, a voltage can be uniformly applied to the surface 2a of the substrate 2 in the measurement region R. Also, a metal having higher conductivity also shows a tendency to have higher thermal conductivity. Therefore, when the conductive layer 4 is formed of a metal having high conductivity, energy of a laser beam irradiated to the substrate 2 can be efficiently transmitted to the sample via the conductive layer 4. Therefore, as the material of the conductive layer 4, a metal having high conductivity is preferably used.

From the above viewpoint, for example, gold (Au), platinum (Pt), or the like is preferably used as the material of the conductive layer 4. The conductive layer 4 is formed at a thickness of about 1 nm to 350 nm using, for example, a plating method, an atomic layer deposition (ALD) method, a vapor deposition method, a sputtering method, or the like. Further, as the material of the conductive layer 4, for example, chromium (Cr), nickel (Ni), titanium (Ti), or the like may also be used.

In the above sample support 1A, a film part 20 and a support part 30 are constituted. The film part 20 is constituted by the substrate 2, and the conductive layer 4 formed in a region of the surface 2a of the substrate 2 corresponding to each measurement region R. The support part 30 is constituted by the frame 3, and the conductive layer 4 formed on a surface of the frame 3 on a side on which the surface 2a faces in the direction D.

The film part 20 includes a first front surface 20a and a first back surface 20b (a surface on a side opposite to the first front surface 20a). In the present embodiment, the first front surface 20a is a surface of the conductive layer 4 on a side opposite to the substrate 2, and the first back surface 20b is the back surface 2b of the substrate 2. A plurality of through-holes 20c that open to the first front surface 20a and the first back surface 20b are formed in the film part 20. Each of the through-holes 20c corresponds to the through-hole 2c formed in the substrate 2. Therefore, a width of each through-hole 20c is, for example, 1 to 700 nm, and the width of the through-hole 20c is a value obtained through the same method as that of the through-hole 2c. Further, illustration of the plurality of through-holes 20c is omitted in FIG. 1.

The support part 30 defines a plurality of measurement regions R with respect to the film part 20 and supports the film part 20. The support part 30 includes an inner portion 31 and an outer portion 32. The inner portion 31 is a portion to which the film part 20 is fixed. When viewed in the direction D, an outer edge 31c of the inner portion 31 coincides with, for example, an outer edge of the substrate 2. The outer portion 32 extends along the outer edge 31c of the inner portion 31. In the present embodiment, an intermediate portion 33 is provided between the inner portion 31 and the outer portion 32, but the intermediate portion 33 may not be provided between the inner portion 31 and the outer portion 32 (that is, the inner portion 31 and the outer portion 32 may be directly connected).

The inner portion 31 has a second front surface 31a and a second back surface 31b (a surface on a side opposite to the second front surface 31a). In the present embodiment, the second back surface 31b is a surface of the frame 3 on a side opposite to the conductive layer 4 in the direction D, and the second front surface 31a is a surface of the conductive layer 4 on a side opposite to the second back surface 31b in the direction D. That is, the second front surface 31a is a surface of the conductive layer 4 on a side opposite to the frame 3, and the second back surface 31b is a surface of the frame 3 on a side opposite to the conductive layer 4. The outer portion 32 has a third front surface 32a and a third back surface 32b (a surface on a side opposite to the third front surface 32a). In the present embodiment, the third back surface 32b is a surface of the frame 3 on a side opposite to the conductive layer 4 in the direction D, and the third front surface 32a is a surface of the conductive layer 4 on a side opposite to the third back surface 32b in the direction D.

That is, the third front surface 32a is a surface of the conductive layer 4 on a side opposite to the frame 3, and the third back surface 32b is a surface of the frame 3 on a side opposite to the conductive layer 4.

The first front surface 20a of the film part 20 and the third front surface 32a of the outer portion 32 are positioned on the same plane (the same plane perpendicular to the direction D). That is, a difference generated between a position of the first front surface 20a of the film part 20 and a position of the third front surface 32a of the outer portion 32 in the direction D (a direction that coincides with a thickness direction of the film part 20 (a direction in which the first front surface 20a and the first back surface 20b face each other)) is zero in the present embodiment and is smaller than the thickness of the film part 20.

The second back surface 31b of the inner portion 31 is positioned on a side (upper side in FIG. 2) on which the first front surface 20a of the film part 20 faces in the direction D with respect to the third back surface 32b of the outer portion 32. The film part 20 (specifically, the surface 2a of the substrate 2) is fixed to the second back surface 31b of the inner portion 31 by the adhesive layer (not illustrated) described above. In the present embodiment, the substrate 2 is disposed in a recessed part having the second back surface 31b of the inner portion 31 as a bottom surface and surrounded by the intermediate portion 33.

[Configuration of Adapter]

Figure 4:
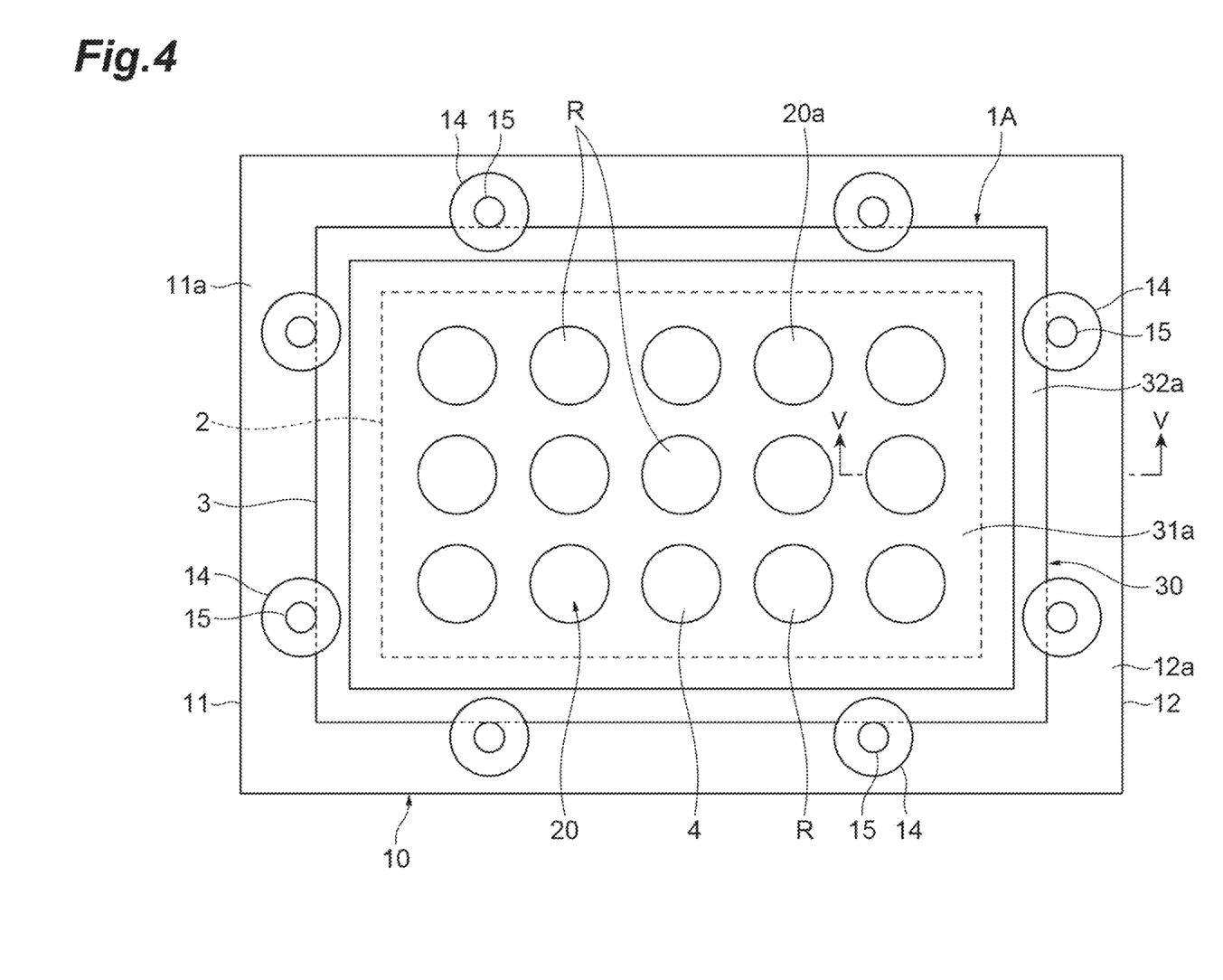
FIG. 4 is a plan view of the sample support and an adapter of the first embodiment.
Figure 5:
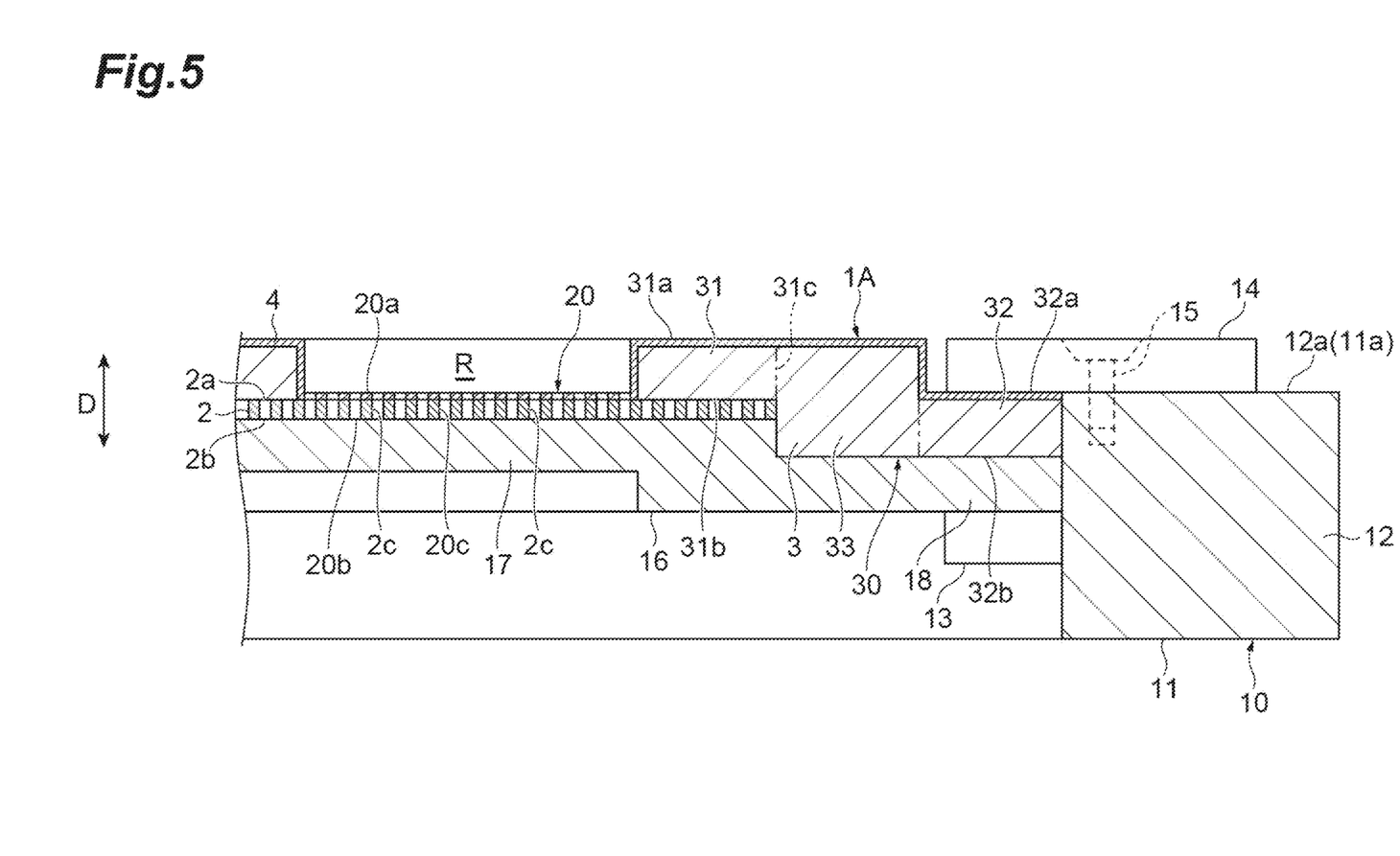
FIG. 5 is a cross-sectional view along line V-V illustrated in FIG. 4.

An adapter 10 illustrated in FIGS. 4 and 5 is used for mounting the above-described sample support 1A on a mass spectrometer. The adapter 10 includes a holding part 11. The holding part 11 includes a main body member 12, a plurality of stoppers 13, and a plurality of sets of washers 14 and bolts 15. The main body member 12 is formed in a rectangular frame shape by, for example, a metal material. The plurality of stoppers 13 are provided on the main body member 12 to protrude inward of the main body member 12. The plurality of sets of washers 14 and bolts 15 can be detachably attached to one surface 12a of the main body member 12. In a state in which the plurality of sets of washers 14 and bolts 15 are fixed to the surface 12a of the main body member 12, a part of each washer 14 and each stopper 13 face each other via a predetermined distance in the direction D. The holding part 11 has a reference surface 11a positioned on the same plane as a focal point of a laser beam (the same plane parallel to an optical axis of the laser beam) in the mass spectrometer. In the present embodiment, the reference surface 11a is the surface 12a of the main body member 12.

The adapter 10 further includes a mount part 16. The mount part 16 is formed, for example, in a rectangular plate shape by a metal material. The mount part 16 in contact with the first back surface 20b of the film part 20 of the sample support 1A is held by the holding part 11 together with the outer portion 32 of the sample support 1A. Specifically, the mount part 16 includes a contact portion 17 and a held portion 18. The held portion 18 extends along an outer edge of the contact portion 17. The contact portion 17 is in contact with the first back surface 20b of the film part 20 in the recessed part having the second back surface 31b of the inner portion 31 as a bottom surface and surrounded by the intermediate portion 33. The held portion 18 is in contact with the third back surface 32b of the outer portion 32 and is held by the holding part 11 together with the outer portion 32. In the present embodiment, a thickness of the outer portion 32 and the held portion 18 in the direction D is substantially equal to the predetermined distance between a part of each washer 14 and each stopper 13.

The sample support 1A is disposed on the plurality of stoppers 13 via the mount part 16, the plurality of sets of washers 14 and bolts 15 are fixed to the surface 12a of the main body member 12 in that state, and thereby the sample support 1A is held by the holding part 11 together with the mount part 16. In a state in which the sample support 1A is held by the holding part 11, the reference surface 11a of the holding part 11 and the third front surface 32a of the outer portion 32 are on the same plane (the same plane parallel to the direction D and the optical axis of the laser beam). That is, the holding part 11 holds the outer portion 32 so that the reference surface 11a of the holding part 11 and the third front surface 32a of the outer portion 32 are positioned on the same plane.

[Ionization Method and Mass Spectrometry Method]

An ionization method and a mass spectrometry method using the sample support 1A and the adapter 10 described above will be described with reference to FIG. 6. First, the sample support 1A is prepared (preparation step). Next, the sample S is disposed in each measurement region R of the sample support 1A (disposition step). In the present embodiment, for example, a solution containing the sample S is dropped onto each measurement region R. Thereby, in each measurement region R, a surplus solution permeates through the plurality of through-holes 20c, and components S1 of the sample S is appropriately retained on the conductive layer 4 (that is, on the first front surface 20a of the film part 20). Next, the sample support 1A in which the sample S is disposed in each measurement region R is mounted on a mass spectrometer 100 using the adapter 10 (mounting step).

Figure 6:
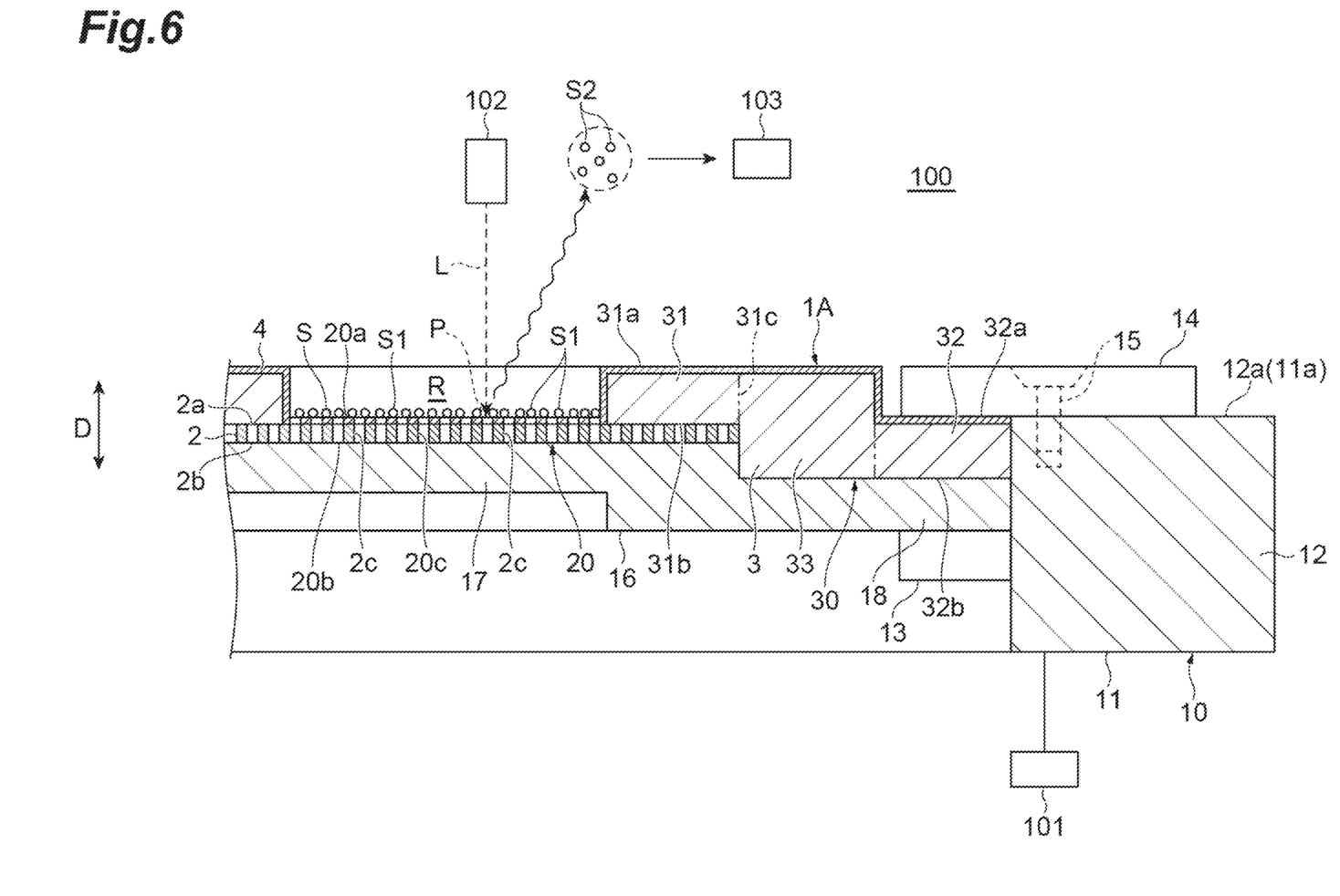
FIG. 6 is a view illustrating a mass spectrometry method of the first embodiment.

Next, a laser beam irradiation part 102 of the mass spectrometer 100 is operated to irradiate each measurement region R with a laser beam (an energy beam) L while operating a voltage application part 101 of the mass spectrometer 100 to apply a voltage to the conductive layer 4 of the sample support 1A via the adapter 10. Thereby, the components S1 of the sample S are ionized (ionization step). At this time, since a focal point P of the laser beam L and the reference surface 11a of the holding part 11 are positioned on the same plane, the reference surface 11a of the holding part 11 and the third front surface 32a of the outer portion 32 are positioned on the same plane, and the third front surface 32a of the outer portion 32 and the first front surface 20a of the film part 20 are positioned on the same plane, the focal point P of the laser beam L is positioned on the first front surface 20a of the film part 20 in which the components S1 of the sample S are retained. The above steps correspond to the ionization method using the sample support 1A and the adapter 10 (in the present embodiment, a laser desorption/ionization method).

Next, sample ions S2 (ionized components S1) discharged due to ionization of the components S1 of the sample S are detected by an ion detector 103 of the mass spectrometer 100 (detection step). Specifically, the discharged sample ions S2 move while being accelerated toward a ground electrode (not illustrated) provided between the sample support 1A and the ion detector 103 due to an electric potential difference generated between the conductive layer 4 to which a voltage is applied and the ground electrode, and thereby are detected by the ion detector 103. In the present embodiment, the mass spectrometer 100 is a scanning mass spectrometer using time-of-flight mass spectrometry (TOF-MS). The above steps correspond to the mass spectrometry method using the sample support 1A and the adapter 10.

[Operation and Effects]

As described above, the first front surface 20a of the film part 20 and the third front surface 32a of the outer portion 32 are positioned on the same plane in the sample support 1A. That is, a difference generated between a position of the first front surface 20a of the film part 20 and a position of the third front surface 32a of the outer portion 32 in the direction D is zero and is smaller than the thickness of the film part 20. Thereby, when the sample support 1A is mounted on the mass spectrometer 100 using the adapter 10 having the reference surface 11a positioned on the same plane as the focal point P of the laser beam L in the mass spectrometer 100, the focal point P of the laser beam L can be aligned with the first front surface 20a of the film part 20 with higher accuracy by causing the adapter 10 to hold the outer portion 32 so that the reference surface 11a of the adapter 10 and the third front surface 32a of the outer portion 32 are positioned on the same plane. Therefore, the sample support 1A enables highly accurate positioning of the focal point P of the laser beam L in the mass spectrometer 100.

Also, according to the sample support 1A, since it can be attached to the adapter 10 without using a tape or the like, convenience of a user is further enhanced. Moreover, for example, when a similar sample support is fixed on a slide glass with a tape or the like, positioning is required each time, but according to the sample support 1A, such positioning is not necessary.

Also, in the sample support 1A, the second back surface 31b of the inner portion 31 is positioned on a side on which the first front surface 20a of the film part 20 faces in the direction D with respect to the third back surface 32b of the outer portion 32, and the film part 20 is fixed to the second back surface 31b of the inner portion 31. Thereby, a configuration in which the focal point P of the laser beam L can be aligned with the first front surface 20a of the film part 20 with high accuracy can be realized with a simple structure.

Also, in the sample support 1A, the film part 20 includes the substrate 2 formed of an insulating material and the conductive layer 4 provided on the first front surface 20a side of the substrate 2 in each measurement region R. Thereby, the components S1 of the sample S can be efficiently ionized in the mass spectrometer 100.

Also, in the sample support 1A, the width of each of the plurality of through-holes 20c is 1 to 700 nm. Thereby, the components S1 of the sample S can be appropriately retained on the first front surface 20a of the film part 20.

Also, the support part 30 defines the plurality of measurement regions R in the sample support 1A. Thereby, the sample S can be analyzed for each measurement region R in the mass spectrometer 100.

Also, in the adapter 10, the holding part 11 has the reference surface 11a positioned on the same plane as the focal point P of the laser beam L in the mass spectrometer 100 and holds the outer portion 32 of the sample support 1A so that the reference surface 11a and the third front surface 32a of the outer portion 32 are positioned on the same plane. Thereby, the focal point P of the laser beam L can be aligned with the first front surface 20a of the film part 20 with high accuracy in the mass spectrometer 100.

Also, in the adapter 10, the mount part 16 in contact with the first back surface 20b of the film part 20 is held by the holding part 11 together with the outer portion 32. Thereby, since the film part 20 can be stably supported, the focal point P of the laser beam L can be more accurately aligned with the first front surface 20a of the film part 20 in the mass spectrometer 100.

Also, according to the ionization method using the sample support 1A and the adapter 10, the components S1 of the sample S can be ionized with the focal point P of the laser beam L aligned with the first front surface 20a of the film part 20 with high accuracy.

Also, in the mass spectrometry method using the sample support 1A and the adapter 10, since the components S1 of the sample S are ionized with the focal point P of the laser beam L aligned with the first front surface 20a of the film part 20 with high accuracy, sensitivity and resolution can be improved in detection of the sample ions S2.

Second Embodiment

Figure 7:
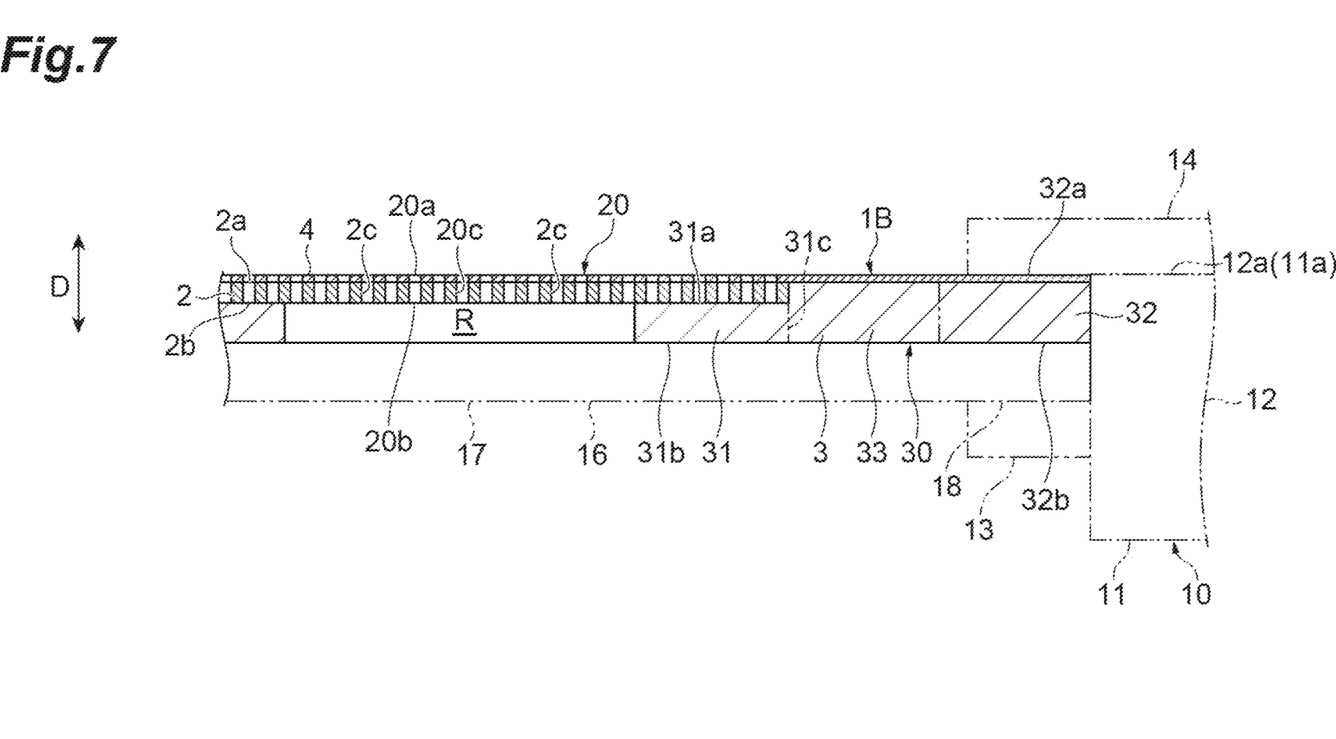
FIG. 7 is a cross-sectional view of a part of a sample support of a second embodiment.

As illustrated in FIG. 7, a sample support 1B is mainly different in a configuration of a support part 30 from the above-described sample support 1A. That is, in the sample support 1B, a second front surface 31a of an inner portion 31 is positioned on a side on which a first back surface 20b of a film part 20 faces in a direction D (on a lower side in FIG. 7) with respect to a third front surface 32a of an outer portion 32. The film part 20 (specifically, a back surface 2b of the substrate 2) is fixed to the second front surface 31a of the inner portion 31 by an adhesive layer (not illustrated) described above. In the present embodiment, the substrate 2 is disposed in a recessed part having the second front surface 31a of the inner portion 31 as a bottom surface and surrounded by an intermediate portion 33. Further, the sample support 1B can also be mounted on a mass spectrometer 100 using an adapter 10 as in the sample support 1A described above. Then, an ionization method and a mass spectrometry method using the sample support 1B and the adapter 10 can be performed as in the first embodiment.

In the sample support 1B configured as described above, a first front surface 20a of the film part 20 and the third front surface 32a of the outer portion 32 are positioned on the same plane. That is, a difference generated between a position of the first front surface 20a of the film part 20 and a position of the third front surface 32a of the outer portion 32 in the direction D is zero and is smaller than a thickness of the film part 20. Thereby, when the sample support 1B is mounted on the mass spectrometer 100 using the adapter 10 having a reference surface 11a positioned on the same plane as a focal point P of a laser beam L in the mass spectrometer 100, the focal point P of the laser beam L can be aligned with the first front surface 20a of the film part 20 with higher accuracy by causing the adapter 10 to hold the outer portion 32 so that the reference surface 11a of the adapter 10 and the third front surface 32a of the outer portion 32 are positioned on the same plane. Therefore, the sample support 1B enables highly accurate positioning of the focal point P of the laser beam L in the mass spectrometer 100.

Also, according to the sample support 1B, since it can be attached to the adapter 10 without using a tape or the like, convenience of a user is further enhanced. Moreover, for example, when a similar sample support is fixed on a slide glass with a tape or the like, positioning is required each time, but according to the sample support 1B, such positioning is not necessary.

Also, in the sample support 1B, the second front surface 31a of the inner portion 31 is positioned on a side on which the first back surface 20b of the film part 20 faces in the direction D with respect to the third front surface 32a of the outer portion 32, and the film part 20 is fixed to the second front surface 31a of the inner portion 31. Thereby, a configuration in which the focal point P of the laser beam L can be aligned with the first front surface 20a of the film part 20 with high accuracy can be realized with a simple structure.

Also, in the sample support 1B, the film part 20 includes the substrate 2 formed of an insulating material and a conductive layer 4 provided on the first front surface 20a side of the substrate 2 in each measurement region R. Thereby, components S1 of a sample S can be efficiently ionized in the mass spectrometer 100.

Also, a width of each of a plurality of through-holes 20c is 1 to 700 nm in the sample support 1B. Thereby, the components S1 of the sample S can be appropriately retained on the first front surface 20a of the film part 20.

Also, the support part 30 defines the plurality of measurement regions R in the sample support 1B. Thereby, the sample S can be analyzed for each measurement region R in the mass spectrometer 100.

Also, in the adapter 10, a holding part 11 has the reference surface 11a positioned on the same plane as the focal point P of the laser beam L in the mass spectrometer 100 and holds the outer portion 32 of the sample support 1B so that the reference surface 11a and the third front surface 32a of the outer portion 32 are positioned on the same plane. Thereby, the focal point P of the laser beam L can be aligned with the first front surface 20a of the film part 20 with high accuracy in the mass spectrometer 100.

Also, in the adapter 10, a mount part 16 in contact with the first back surface 20b of the film part 20 is held by the holding part 11 together with the outer portion 32. Thereby, since the film part 20 can be stably supported, the focal point P of the laser beam L can be more accurately aligned with the first front surface 20a of the film part 20 in the mass spectrometer 100.

Also, according to the ionization method using the sample support 1B and the adapter 10, the components S1 of the sample S can be ionized with the focal point P of the laser beam L aligned with the first front surface 20a of the film part 20 with high accuracy.

Also, in the mass spectrometry method using the sample support 1B and the adapter 10, since the components S1 of the sample S are ionized with the focal point P of the laser beam L aligned with the first front surface 20a of the film part 20 with high accuracy, sensitivity and resolution can be improved in detection of sample ions S2.

Modified Example

Figure 8:
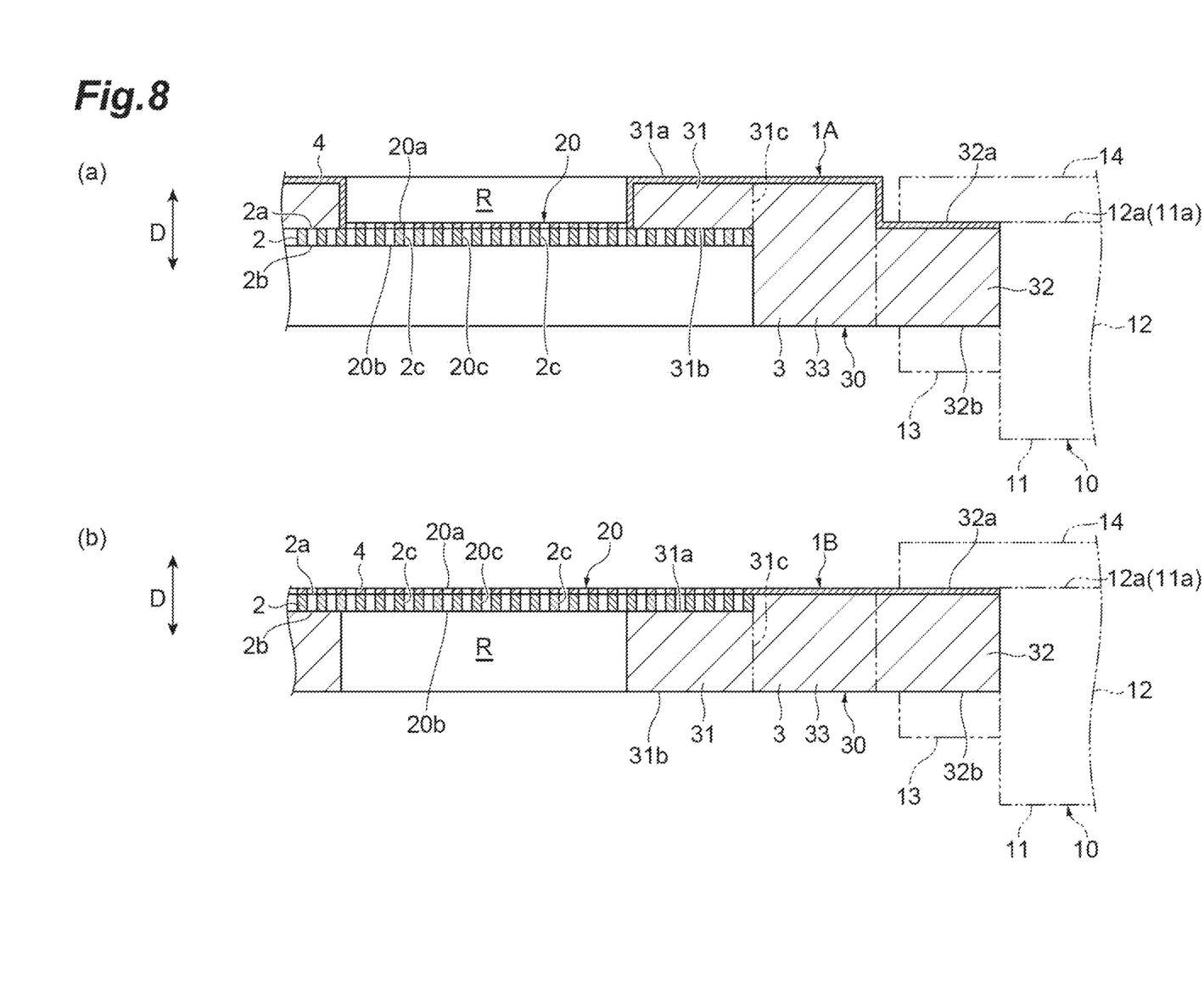
FIG. 8 is a cross-sectional view of a part of a sample support of a modified example.

As illustrated in (a) and (b) of FIG. 8, in each of the sample support 1A and the sample support 1B, a thickness of the outer portion 32 in the direction D may be substantially equal to a predetermined distance between a part of each washer 14 and each stopper 13. In these cases, each of the sample support 1A and the sample support 1B can be attached to the adapter 10 without using the mount part 16.

Also, in each of the sample support 1A and the sample support 1B, if a difference generated between a position of the first front surface 20a of the film part 20 and a position of the third front surface 32a of the outer portion 32 in the direction D is smaller than a thickness of the film part 20, the first front surface 20a of the film part 20 and the third front surface 32a of the outer portion 32 may not be positioned on the same plane perpendicular to the direction D. Also in this case, when the adapter 10 is caused to hold the outer portion 32 of the support part 30 so that the reference surface 11a of the adapter 10 and the third front surface 32a of the outer portion 32 are positioned on the same plane, the focal point P of the laser beam L can be aligned with the first front surface 20a of the film part 20 at a lower level than the thickness of the film part 20.

Also, the holding part 11 of the adapter 10 is not limited to the above-described configuration (that is, the configuration including the main body member 12, the plurality of stoppers 13, and the plurality of sets of washers 14 and bolts 15) as long as it can hold the outer portion 32 so that the reference surface 11a of the adapter 10 and the third front surface 32a of the outer portion 32 are positioned on the same plane.

Also, in each of the sample support 1A and the sample support 1B, the conductive layer 4 may be provided at least on the surface 2a of the substrate 2. That is, when the conductive layer 4 is provided on the surface 2a of the substrate 2, the conductive layer 4 may or may not be provided on the back surface 2b of the substrate 2 and on the inner surface of each through-hole 2c.

Also, the substrate 2 may have conductivity in each of the sample support 1A and the sample support 1B. According to such a configuration, since a voltage can be applied to the substrate 2 when the ionization method and the mass spectrometry method are performed, the conductive layer 4 can be omitted in each of the sample support 1A and the sample support 1B.

Figure 9:
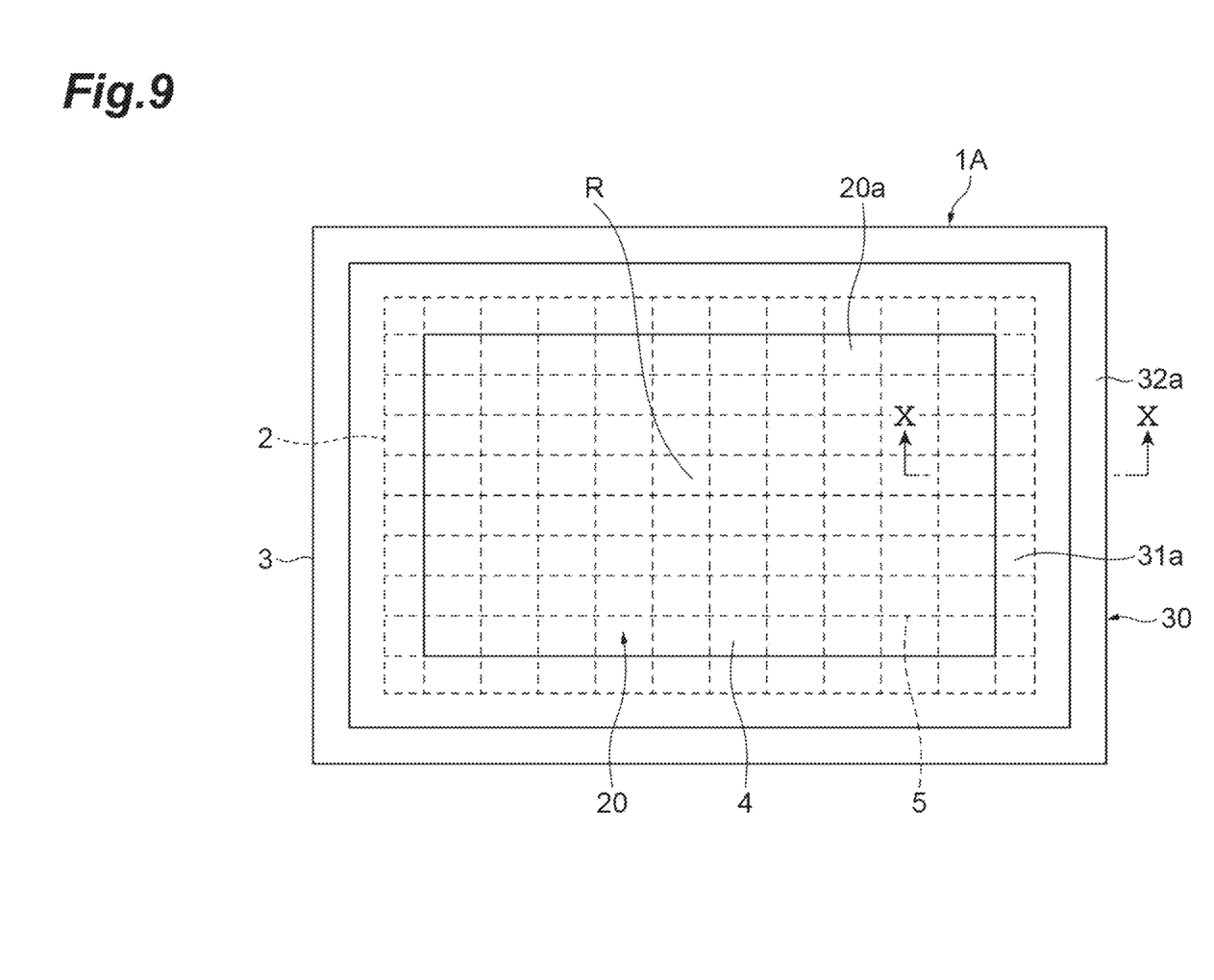
FIG. 9 is a plan view of the sample support of the modified example.
Figure 10:
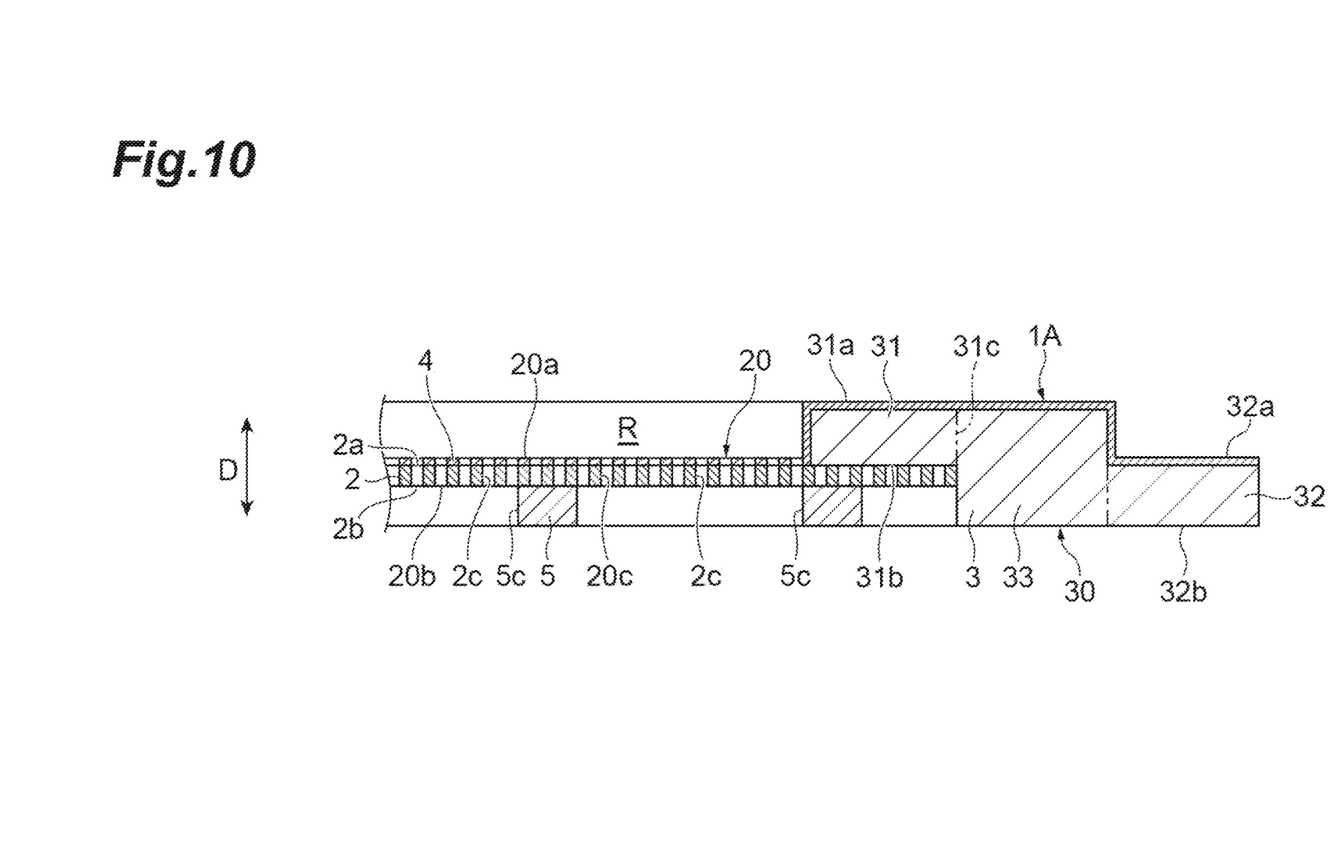
FIG. 10 is a cross-sectional view along line X-X illustrated in FIG. 9.

Also, the support part 30 may define one measurement region R in each of the sample support 1A and the sample support 1B. Also, as illustrated in FIGS. 9 and 10, the sample support 1A may further include a reinforcing layer 5 in which a plurality of openings 5c are formed to have an aperture ratio larger than the aperture ratio of the through-holes 2c in the measurement region R. The reinforcing layer 5 may be formed, for example, in a mesh shape and is provided on the back surface 2b side of the substrate 2. In such a configuration, for example, when the reinforcing layer 5 is brought into contact with a sample such as, for example, a biological sample, components of the sample can be transferred to the first front surface 20a of the film part 20 through the openings 5c of the reinforcing layer 5 and the through-holes 2c of the substrate 2 (that is, the through-holes 20c of the film part 20). Therefore, according to such a configuration, components of the sample can be transferred to the first front surface 20a of the film part 20 while maintaining a two-dimensional distribution of the components of the sample, and a two-dimensional distribution image of the components of the sample can be acquired. Similarly, the sample support 1B may further include a reinforcing layer in which a plurality of openings are formed to have an aperture ratio larger than the aperture ratio of the through-holes 2c in the measurement region R.

Also, applications of the sample support 1A and the sample support 1B are not limited to the ionization of the sample S using irradiation of the laser beam L. The sample support 1A and the sample support 1B can be used for ionization of the sample S using irradiation of an energy beam such as a laser beam, an ion beam, or an electron beam. In the above-described ionization method and mass spectrometry method, the sample S can be ionized by irradiation of an energy beam.

REFERENCE SIGNS LIST 1A, 1B: Sample support, 2: Substrate, 4: Conductive layer, 10: Adapter, 11: Holding part, 11a: Reference surface, 16: Mount part, 20: Film part, 20a: First front surface, 20b: First back surface, 20c: Through-hole, 30: Support part, 31: Inner portion, 31a: Second front surface, 31b: Second back surface, 31c: Outer edge, 32: Outer portion, 32a: Third front surface, 32b: Third back surface, 100: Mass spectrometer, D: Direction (thickness direction), L: Laser beam (energy beam), P: Focal point, R: Measurement region, S: Sample, S1: Component, S2: Sample ion (ionized component).

The invention claimed is:

1. A sample support used for ionization of a sample, the sample support comprising:
 a film part having a first front surface and a first back surface, the film part being formed with a plurality of through-holes opening to the first front surface and the first back surface; and
 a support part defining a measurement region for ionizing the sample with respect to the film part and supporting the film part, wherein
 the support part includes:
 an inner portion having a second front surface and a second back surface, the film part being fixed to the inner portion; and
 an outer portion having a third front surface and a third back surface and extending along an outer edge of the inner portion, and
 a difference generated between a position of the first front surface and a position of the third front surface in a thickness direction of the film part is smaller than a thickness of the film part.

2. The sample support according to claim 1, wherein the first front surface and the third front surface are positioned on the same plane.

3. The sample support according to claim 1, wherein the second back surface is positioned on a side on which the first front surface faces in the thickness direction with respect to the third back surface, and the film part is fixed to the second back surface.

4. The sample support according to claim 1, wherein the second front surface is positioned on a side on which the first back surface faces in the thickness direction with respect to the third front surface, and the film part is fixed to the second front surface.

5. The sample support according to claim 1, wherein the film part includes:
 a substrate formed of an insulating material; and
 a conductive layer provided at least on the first front surface side with respect to the substrate at least in the measurement region.

6. The sample support according to claim 1, wherein a width of each of the plurality of through-holes is 1 to 700 nm.

7. The sample support according to claim 1, wherein the support part defines a plurality of measurement regions, each of the plurality of measurement regions being the measurement region.

8. An adapter used for mounting the sample support according to claim 1 on a mass spectrometer, the adapter comprising a holding part having a reference surface positioned on the same plane as a focal point of an energy beam in the mass spectrometer and configured to hold the outer portion so that the reference surface and the third front surface are positioned on the same plane.

9. The adapter according to claim 8, further comprising a mount part configured to be held by the holding part together with the outer portion in a state in which the mount part is in contact with the first back surface.

10. An ionization method comprising:
 a step of preparing the sample support according to claim 1;
 a step of disposing the sample in the measurement region;
 a step of mounting the sample support on a mass spectrometer using an adapter including a holding part having a reference surface positioned on the same plane as a focal point of an energy beam in the mass spectrometer and configured to hold the outer portion so that the reference surface and the third front surface are positioned on the same plane; and
 a step of ionizing components of the sample by irradiating the measurement region with an energy beam.

11. A mass spectrometry method comprising:
 a plurality of steps included in the ionization method according to claim 10; and
 a step of detecting the ionized components.

* * * * *